May 3, 1938.    R. P. LEWIS    2,115,819
VIBRATION DAMPENER
Filed May 22, 1933    3 Sheets-Sheet 1

Inventor
Robert P. Lewis
By Strauch & Hoffman
Attorneys

May 3, 1938.                R. P. LEWIS                    2,115,819
                         VIBRATION DAMPENER
                        Filed May 22, 1933            3 Sheets-Sheet 2
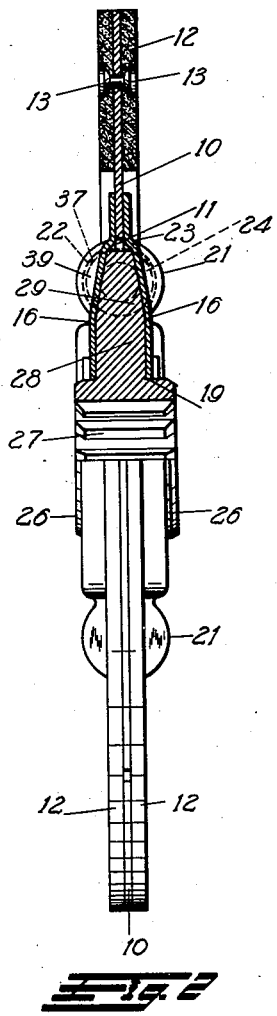
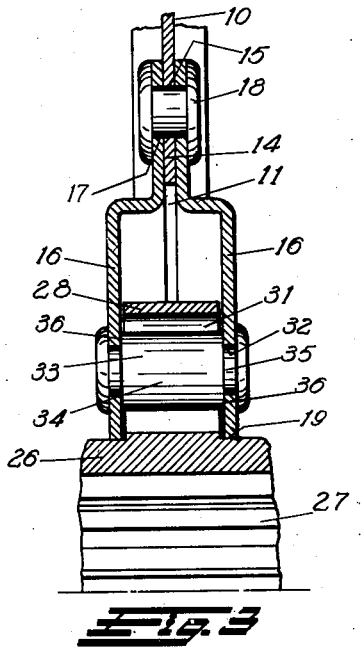
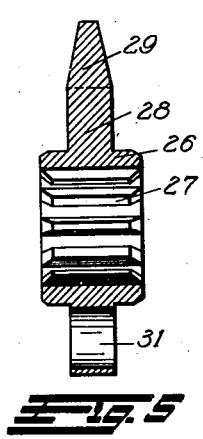
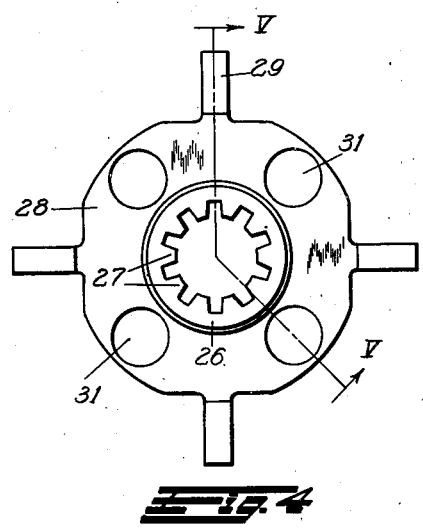
Inventor
Robert P. Lewis
By Strauch & Hoffman
           Attorneys May 3, 1938.    R. P. LEWIS    2,115,819
VIBRATION DAMPENER
Filed May 22, 1933    3 Sheets-Sheet 3
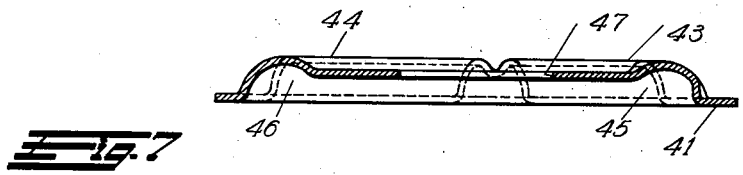
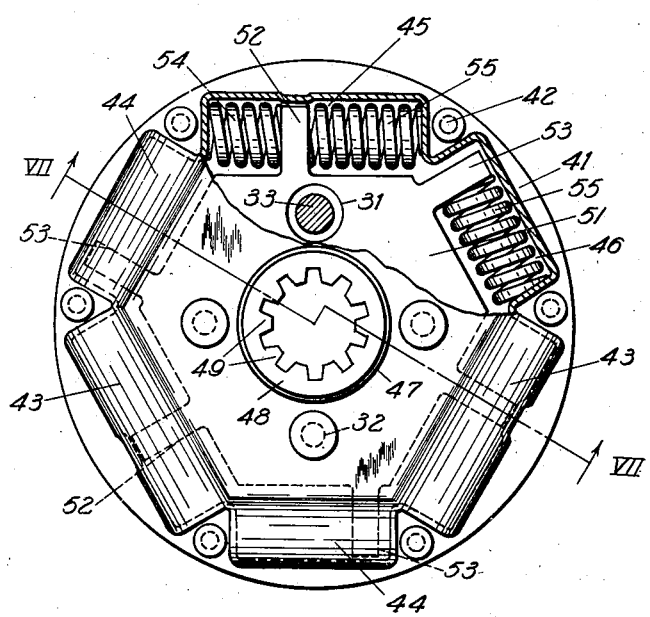
Inventor
Robert P. Lewis
Strauch + Hoffman
Attorneys Patented May 3, 1938

2,115,819

UNITED STATES PATENT OFFICE 2,115,819

VIBRATION DAMPENER

Robert P. Lewis, Toledo, Ohio, assignor to Spicer Manufacturing Corporation, Toledo, Ohio, a corporation of Virginia Application May 22, 1933, Serial No. 672,364

10 Claims. (Cl. 192—68)

This invention relates to shock absorbing and vibration dampening mechanisms of the type generally employed in power transmission units and more particularly, to shock absorbing and vibration dampening mechanisms employed in motor vehicles.

While the invention as described herein is susceptible of many uses, such as in shaft or rod couplings, universal joints, and the like, its embodiment in the clutch of a motor vehicle will be described in detail for the purposes of illustration.

In present-type clutches as employed in motor vehicles, the flywheel of the motor is ordinarily used as a driving member to transmit power to the transmission and differential of the vehicle, a suitable friction surface being formed on the flywheel. A transmitting element connected to a suitable shaft is arranged to be shifted into and out of engagement with the surface of the flywheel as desired and receive power therefrom. In the usual type of manually operated clutch, the transmitting element consists of a disc having a ring of friction material thereon which is forced into driving engagement with the friction surface on the flywheel by a spring-actuated presser plate controlled by the operator of the vehicle. In automatic clutches of more recent development, the transmitting element likewise engages the flywheel, but is forced into engagement therewith by another plate having a friction element thereon and actuated by suitable automatic means controlled by the speed of the motor, movement of the vehicle, or other factor.

In all types of clutches, manual or automatic, like conditions must be met as regards the conditions under which power must be transmitted and the shocks and jars to which clutches are subject. Accordingly, such clutches must be of strong and rugged construction in order to operate properly over extended periods of time without biting or slipping. Such construction demands relatively large amounts of material and, as a consequence, the clutch is characterized by considerable inertia which, by reason of the constant acceleration and deceleration of the motor vehicle, gives rise to severe shocks and chattering with accompanying wear and tear on the clutch and the development of vibrations and noises audible and annoying to the occupants of the vehicle. Repair of the clutch is then necessary and, since the clutch is usually so mounted that it must be entirely dismantled for proper repair, considerable expense is involved.

The motors of some motor vehicles are characterized by the creation in the crank shaft of a periodic vibration, which occurs at or around one or more particular speeds of the motor and may be due to one or more of the explosions in the cylinders synchronizing in point of time with the natural period of vibration of the crank shaft. This vibration is transmitted not only to the supporting elements of the motor but also to the clutch and its associated elements, such as the gear box, and may result in an annoying periodic chatter in the transmission. This chatter is not only annoying from an audible standpoint, but produces an undesirable effect on the mechanism, since it subjects it to a succession of varying periodic strains during operation.

The above disadvantages with their attendant ill effects have been overcome by the present invention, which has as an object the provision of an improved shock absorbing and vibration dampening mechanism, particularly adapted for devices involving torque transmission elements, such as clutches, which is possessed of sufficient inherent flexibility to dampen or absorb vibrations and noises proceeding from the motor of a motor vehicle and prevent transmission thereof to other portions of the mechanism where such vibrations and noises would be objectionable to the ear and detrimental to the mechanism.

A further object is the provision of an improved vibration dampening mechanism in a torque transmission element such as a clutch plate that is characterized by a sufficient amount of inherent torsional flexibility to absorb vibrations received from a driving member such as the flywheel of a motor in connection with the reception of power therefrom and deliver the power in undiminished quantity but with the vibrations formerly associated therewith removed to the adjacent power transmitting elements.

Still a further object of this invention is to provide an improved shock absorbing mechanism for use in a power transmission element, such as a clutch of a motor vehicle, which will iron out or cushion any shocks or jolts arising from sudden changes in angular velocity of the power transmission elements, as happens when a motor vehicle is accelerating or decelerating with an accompanying alternation of the motor driving the vehicle and the vehicle driving the motor.

A further object of this invention is to provide an improved shock absorbing mechanism in combination with a clutch element which will absorb torque shocks and relieve the associated mechanism such as the transmission, differential and universals from jolts, jars and shocks, which would induce excessive wear.

A further object of this invention is the provision of an improved vibration dampening means in combination with a clutch element which automatically dampens out vibrations and irregularities in rotation and tends to produce smooth and uniform rotation of its associated elements particularly during changes in the rate of rotation.

It is still a further object to provide an improved shock absorbing mechanism in combination with a clutch element for a motor vehicle which will cushion the shock usually attendant upon the engagement of clutch members and establish a smooth, steady transmission of torque to the driving mechanism.

A further object of this invention is to provide a shock absorbing and vibration dampening mechanism having retaining means for cushioning elements such as springs contained therein, the retaining means serving to retain the springs, if broken, and prevent them from getting into and damaging the associated mechanism, while permitting full freedom of movement with no restriction.

Still a further object of this invention is to provide a vibration dampening mechanism for use in a torque transmission system and embodying both cushioning means and positive drive means, the cushioning means being entirely enclosed and designed to operate prior to the positive drive means.

A further object of this invention is the production of a shock absorbing and vibration dampening mechanism for use in a torque-transmission system characterized by a different reaction in one direction of torque transmission therethrough than in another.

A further object of this invention is to provide a shock absorbing and vibration dampening mechanism for use in torque-transmission systems embodying a plurality of individual cushioning means, the individual means being so arranged that the number thereof reacting to different directions of torque-transmission therethrough may be varied.

Still a further object of this invention is the provision of a shock absorbing and vibration dampening mechanism for use in torque-transmission systems embodying a plurality of spring members for dampening vibrations, the number and resiliency of the springs effective in different directions of torque-transmission being susceptible of ready adjustment for adaptation to varying conditions.

A further object of this invention is to embody vibration dampening means in a clutch plate, the clutch plate being characterized by a friction element support of relatively light construction, through which the driving force is equally distributed by means engaging the vibration dampening means, thereby avoiding the concentration of a force of marked intensity on the support and preventing the possibility of distortion or misalignment.

Still a further object of this invention is the provision in a clutch plate for a motor vehicle of vibration dampening means operative when the motor is driving the vehicle and when the vehicle is driving the motor, the design of the vibration dampening means being such that a maximum of space is devoted to shock absorbing means operative when the motor is driving the vehicle.

Other objects, not specifically enumerated above, will become apparent as the description of the present invention proceeds in connection with the accompanying drawings, wherein Figure 1 is an elevation of a preferred embodiment of the present invention as employed in a clutch plate with a portion of a cover plate broken away to disclose a portion of the vibration dampening means therein;

Figure 2 is a side elevation of the clutch plate of Figure 1 with a portion thereof taken in section as indicated by the line II—II on Figure 1;

Figure 3 is an enlarged section of a portion of the clutch plate of Figure 1 illustrating in detail the means for obtaining limited relative movement between the cover plates and the hub and taken on the line III—III on Figure 1;

Figure 4 is an elevation of the hub of the clutch plate shown in Figure 1;

Figure 5 is a view in section of the hub of Figure 4 taken on the line V—V of Figure 4;

Figure 6 is an elevation of a further preferred embodiment of this invention with a portion of a cover plate broken away to disclose a portion of the vibration dampening means therein;

Figure 7 is a section of the cover plate of the embodiment of Figure 6 taken on the line VII—VII of Figure 6; and Figure 8 is a perspective of the combined fastening and stop means employed in the dampener of this invention.

Figure 1:
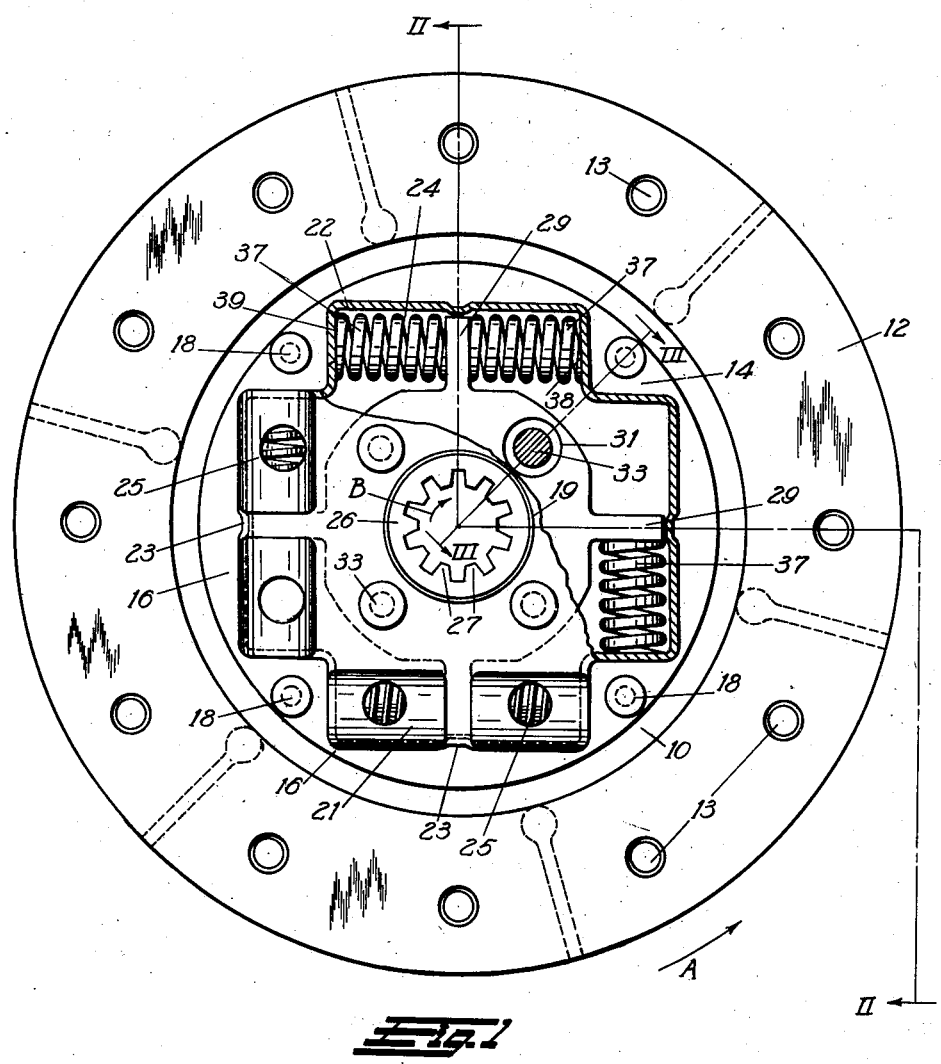

Referring to the drawings in which like reference characters are used to denote corresponding parts and in which a clutch plate has been illustrated as an example of an application of the present invention, 10 indicates a clutch disk which is provided with a centrally disposed opening 11 of somewhat square configuration and rings 12 of friction material that are positioned adjacent the outer periphery thereof and suitably secured thereto by fastening means such as rivets 13 passing through friction rings 12 and disk 10 as shown in Figure 2. Rings 12 are provided to engage like frictional elements on associated parts of a clutch mechanism (not shown). Since such clutch constructions are well known in the art, further description thereof is deemed unnecessary.

While opening 11 is of generally square configuration, projections 14 are formed in the corners of what would otherwise approximate a square, each projection being provided with an aperture 15, the series of apertures lying on a circle having its center at the center of the clutch plate. On each side of the inner portion of disc 10 and overlapping the sides is a cover plate 16. Cover plates 16 are substantially identical in construction and thus cut down cost in manufacture since a single disc may be used for the two elements of the vibration dampening mechanism. Plates 16 are preferably circular and of a size to overlap the inner portion of disc 10. Plates 16 are formed with apertures 17 disposed to coincide with apertures 15 of disc 10 enabling rivets, bolts or other suitable fastening means designated at 18 to pass therethrough and secure cover plates 16 and disc 10 in fixed relation. It is to be noted that the relation of cover plates 16 and disc 10 by reason of the overlapping frictional engagement and the rigid fastening means 18 is such that a transmission of torque therebetween in either direction is evenly distributed through the contacting surfaces of both elements and no force of marked intensity is directed against any portion of either element to cause bending or misalignment thereof. On the contrary, the contact is such that a torque application tends to maintain all elements in alignment and prevent their distortion.

Plates 16, except for the portions contacting with disc 10 and adjacent apertures 17 are of general concave shape and are provided in their central portions with openings 19 which serve a purpose to be later described.

Adjacent their point of contact with disc 10, plates 16 are formed with a series of protuberances 21 which define recesses 22 on the inner faces. Each plate is preferably formed with four protuberances but the number thereof may be varied as the exact number of protuberances employed has no relation to the present invention. Plates 16 are preferably formed with a slight indentation or neck 23 at approximately the center of protuberances 21 so that two recesses are defined in each protuberance separated by the short neck 23 of restricted proportions.

When a pair of plates 16 are assembled and secured to a disc 10, as shown in Figure 2, recesses 22 and necks 23 are so aligned that they define a series of chambers 24 around the inner periphery of disc 10. Chambers 24 are preferably circular in cross section and are closed except for a small elongated opening at the inner side. Ventilating holes 25 may be provided in the walls of the chambers, if desired.

A hub 26 is provided in central openings 19 of plates 16, openings 19 being of slightly greater diameter than the immediate portions of hub 26 whereby hub 26 serves as an axis on which plates 16 are rotatably mounted. The inner surface of hub 26 is splined in well known manner as indicated at 27 for driving connection with a shaft (not shown). A flange 28 is provided around the central portion of the hub and extends therefrom in a substantially circular configuration as shown in Figure 4 with flattened portions at 90° intervals. Flange 28 is provided on its periphery with a series of regularly spaced projecting lugs 29, one lug being allotted to each flattened portion, which lugs 29 as shown in Figure 5 are shaped in cross-section as a truncated triangle.

When plates 16 are assembled and fixed to the disc 10 with hub 26 occupying their central openings 19, flange 28 and lugs 29 lie between plates 16 and are so dimensioned as to move freely therebetween. It is to be noted that while flange 28 terminates short of chambers 24, lugs 29 project therein and in Figure 1 are shown as aligning with necks 23.

To limit relative movement between plates 16 and hub 26, a series of circular apertures 31 are provided in flange 28 which may be aligned with a like series of circular apertures 32 on each of cover plates 16. It will be noted that apertures 31 are of greater diameter than apertures 32. A fastening element, that in its preferred embodiment is a rivet or bolt member, as shown at 33, is passed through apertures 31 and 32. Rivet 33, throughout the major portion of its length, is preferably of greater diameter than apertures 32 and of less diameter than apertures 31, as shown at 34. This permits the formation of reduced portions 35 that with portions 34 define shoulders 36, which space the plates 16 sufficiently apart to insure no frictional contact with flange 28 or lugs 29. The ends of portions 35 may be peaned to rigidly engage plates 16 or any other suitable means of securing may be employed.

The relative size of apertures 31 and portions 34 of rivets 33 permits a limited relative movement between the hub 26 and plates 16 which serves a purpose to be later described.

To the assembly as described thus far, springs 37 are added and placed in chambers 24. Springs 37 have as their reacting surfaces end walls 38 and 39 of chambers 24 and lugs 29. All the chambers 24 may be provided with springs 37 or only a limited number thereof supplied in accordance with the conditions to which the vibration dampening mechanism is to be subjected, as will be hereafter discussed.

To explain the shock-absorbing and vibration dampening characteristics of the mechanism as embodied for illustrative purposes in a clutch plate, let it be assumed that the clutch plate is revolving in the direction indicated by arrow A when the motor is driving the vehicle, in which case hub 26 will react in a direction indicated by arrow B. Friction elements 12, being driven by a suitable connection from the motor, will drive disc 10 and, in turn, plates 16 which will force end walls 38 of compartments 24 against springs 37 to the clockwise side of lugs 29. Compression of springs 37 will take place, which will act to drive lugs 29 in a counterclockwise direction. Under the increasing pressure of springs 37, lugs 29 will be gradually put in motion and drive flange 28 and hub 26. Since this action is communicated only through the springs 37 to lugs 29, there will be a cushioning effect and the application of the torque to hub 26 will be without shock or jar. As springs 37 approach their limit of compression, rivets 33 engage the counterclockwise sides of apertures 31 of flange 28 and a positive drive is established from plates 16 to hub 26. The preferred resiliency and strength of springs 37 is such that they will not normally support the full torque that may be applied to the clutch, but they operate to obtain the cushioning effect at the initial application of torque and thereafter serve to iron out and absorb the vibrations, shocks and jars and particularly the changes in angular velocity and rate of rotation arising from the varying power demand made by the vehicle as it proceeds along the average road which offers a multiplicity of small up and down grades.

In the event that the vehicle is going down grade or is decelerating in which case the vehicle normally drives the motor, the drive is from hub 26 to plates 16 and the springs on the counterclockwise side of lugs 29 are utilized as shock absorbing and vibration dampening means. Thus, although the various elements are rotating in the same direction, the direction of drive through the clutch is opposite to that where the motor drives the vehicle and it is to such drive conditions that the terms "direction of drive", "drive in one direction", or the like refer in the claims. Again unlimited relative movement between hub 26 and plates 16 is precluded by rivets 33 acting in enlarged apertures 31.

Since the load through the clutch when the vehicle is driving is approximately 25% of that when the motor is driving, the number of springs on the vehicle driving side may be reduced as shown in Figure 1 wherein two springs in tandem are used only in alternate compartments and single springs in the remaining compartments. If desired, the same number of springs may be used for both directions of drive, the springs on the vehicle driving side of lugs 29 being weaker than those on the motor driving side.

In order to prevent vibration of the springs in the vibration mechanism at their normal periods of vibration, the springs selected may be such that they have different periods of vibration in which case as one spring may have a tendency to vibrate, the others will prevent its so doing.

It will be noted that the springs which are not compressed between the end walls of chambers 24 and lugs 29 do not expand with the movement of lugs 29 away from them, but are held in position by necks 23 as shown in Figure 2, necks 23 being wide enough to permit free movement of lugs 29, but not wide enough to permit springs 37 to pass therethrough.

In the preferred embodiment illustrated in Figure 6, a different type of cover plate is used as shown at 41. Since this particular modification is not shown as embodied in a clutch assembly, but is adaptable for other uses where shock absorbing and vibration-dampening mechanism is desirable, as in shaft couplings, universal joints, and the like, there is no disc between cover plates 41 and they are fastened face to face by suitable fastening means, such as rivets 42.

Plates 41 are formed with a plurality of protuberances 43 and 44 of different size, the protuberances of the same size being alternately positioned as illustrated. Protuberances 43 and 44 of plates 41, when brought together in the position shown, define compartments 45 and 46, respectively, which are also of different size.

Each plate 41 is formed with a central opening 47 of a size to rotatably accommodate a hub 48, which may be provided with splines 49 or other suitable means for connection to a shaft. Preferably at its mid-portion, hub 48 is provided with a flange 51 of general hexagonal shape. It is preferred to form flange 51 integral with hub 48, but it may be suitably bolted, riveted, or otherwise secured. Lugs 52 and 53 are formed at the periphery of flange 51, one lug being placed on each side of the hexagon and located to extend into chambers 45 and 46, as shown.

Chambers 45 are so dimensioned and lugs 52 so positioned therein as to permit the use of two springs, i. e., springs 54 and 55, one on each side of the lugs as shown. Chambers 46 are of smaller size than chambers 45 and contain only one spring 55. This arrangement permits the use of a maximum number of springs in the direction of transmission of the greatest torque and a lesser number of springs in the opposite direction while utilizing all the available spring space.

To prevent unlimited relative movement between hub 48 and plate 41, a fastening member 33 is provided in cooperation with enlarged apertures 31 in hub 48 and apertures 32 of reduced size in plates 41 in substantially the same manner as shown in Figure 3.

In operation, let it be assumed that the maximum torque delivery is when hub 48 is rotating in a clockwise direction and the reaction of plates 41 is in a counterclockwise direction. Lugs 52 and 53 will act to compress springs 55 against the end walls of chambers 45 and 46. After springs 55 have compressed to some extent, plates 41 will commence to revolve under the pressure of the springs against the end walls of the chambers. If the resistance of plates 41 to rotation is such that the springs under their maximum compression do not cause it to rotate, fastening members 33 located in apertures 32 of plates 41 are then engaged by the sides of apertures 31 in hub 48 and a positive drive is established.

When torque is transmitted in the opposite direction which has been assumed for illustrative purposes to be the lesser torque, lugs 52 engage springs 54, which are not only of less strength but less in number than springs 55 and accordingly resist the application of torque only to a degree to obtain the desired cushioning action. Springs 54 react against the end walls of chambers 45 and cause rotation of plates 41, the relative movement between hub 48 and plates 41 being determined by the play of fastenings 33 in apertures 31, the latter being preferably so dimensioned as to come into contact and positive driving relation in sufficient time to prevent contact between the counterclockwise sides of lugs 53 and the adjacent ends of chambers 46.

While in the particular illustration, six springs have been shown, as in operation in one direction of torque delivery and only three in another direction, the showing does not limit the invention described therein, as it is to be understood that the number and strength of the springs may be varied to suit the conditions to which the combined shock absorbing and vibration dampening mechanism is to be subjected.

While one preferred embodiment of this invention has been described in connection with a clutch plate, it is to be understood that it is not to be so limited and is applicable to any connection or mechanism where it is desirable to absorb shocks and vibrations, such as in universal joints, shaft or rod couplings and the like. For instance, the embodiment of Figure 6 may be readily employed as a shaft or rod coupling by securing one shaft or rod to hub 48 by suitable fastening means and securing the other shaft or rod to cover plates 41, either by a yoke coupling or other suitable arrangement.

From the foregoing description of the shock absorbing and vibration dampening mechanism of this invention, it is apparent that it is possessed of a number of advantages. For instance, it has been found particularly adaptable for use in couplings of different kinds when associated with a torque transmission system characterized by numerous variations in angular velocity as are present in the drive mechanism of a motor vehicle. When embodied, for example, in a universal or clutch mechanism connecting the motor of a motor vehicle to the differential mechanism, vibrations and noises emanating from the motor are removed while the power is transmitted undiminished, thus preventing unnecessary wear and tear upon the transmission, differential and associated elements and eliminating the possibility of noises and vibrations that would annoy the occupants of the vehicle.

The shock absorbing and vibration dampening mechanism is self-contained and all moving parts therein are enclosed and protected from the associated mechanism. This enclosure likewise insures against the possibility of broken elements of the mechanism getting into the associated mechanism and causing injury thereto. The feature of being able to vary the reaction of the mechanism in different directions of torque transmission is distinctly of great value since it permits the mechanism to be simply adjusted to meet varying conditions either by a change in number or a change in character of the individual cushioning means. In this manner, the same mechanism may be employed under different conditions by only changing the individual cushioning means.

The adjustment is especially desirable in the case of a motor vehicle wherein the power transmission in one direction is only about one-fourth of the power transmission in the opposite direction. Under such circumstances, the arrangement as described herein permits a maximum of space to be devoted to the cushioning means reacting to the greater power transmission.

In this description and the following claims wherein the word "driven" is applied to one element as distinguishing it from another element termed "driving", it is to be understood that this use of the term is solely for the purpose of description and is not to be considered as limiting since in a direction of torque transmission opposite to that assumed, the "driving" element would become the "driven" element and the "driven" element would become the "driving" element.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a shock absorbing and vibration dampening mechanism, a disc arranged to drive or be driven and having an opening therein; a plurality of plates covering said opening and defining a series of substantially closed compartments; a hub mounted for relative movement with respect to said plates and arranged to drive or be driven in cooperation with said disc; resilient means comprising coil springs positioned in said compartments; and lugs on said hub disposed to engage said resilient means, the resilient means in one direction of drive being characterized by a greater reaction than in another direction of drive.

2. In a shock absorbing and vibration dampening mechanism, a disc arranged to drive or be driven and having an opening therein; a plurality of plates extending over said opening and defining a series of substantially closed compartments; a hub mounted for relative movement with respect to said plates and arranged to drive or be driven in cooperation with said disc; a plurality of resilient means comprising coil springs positioned in said compartments; and lugs on said hub disposed to engage said resilient means, a greater number of springs being arranged to function in one direction of drive than in another.

3. In a shock absorbing and vibration dampening mechanism, a disc arranged to drive or be driven and having an opening therein; a plurality of means covering said opening and defining a series of substantially closed compartments; coil springs positioned in said compartments; means arranged to drive or be driven mounted for relative movement with respect to said covering means and arranged to engage said springs; and means to limit relative movement between said covering means and said last mentioned means, said springs being characterized by a greater reaction in one direction of drive than another.

4. In a shock absorbing and vibration dampening mechanism, a disc arranged to drive or be driven; and having an opening therein; a plurality of plates fixed to said disc and extending over said opening; said plates defining a series of substantially closed compartments; coil springs positioned in said compartments; a hub mounted to rotate relative to said plates and drive or be driven in cooperation with said disc; lugs on said hub disposed between said springs; and means to limit relative movement between said plates and said hub, a greater number of springs being arranged to function in one direction of drive than in another.

5. In a clutch plate, a friction disc having an opening therein; a plurality of plates fixed to said disc and extending over said opening, said plates being provided with centrally located apertures and a plurality of radially disposed apertures; recesses in said plates arranged in complemental relation to define a series of substantially closed compartments; springs in said compartments; a hub disposed within said centrally located plate apertures and having a series of apertures substantially coinciding with said radially disposed plate apertures; lugs on said hub engaging the springs in said compartments; and fastening means passing through the radially disposed apertures in said hub and cover plates and of a size smaller than one of said apertures to permit limited relative movement therebetween.

6. In a clutch plate, a friction disc having an opening therein; a plurality of plates fixed to said disc and extending over said opening, said plates being provided with centrally located apertures and radially disposed apertures; recesses in said plates arranged in complemental relation to define a series of substantially closed compartments; springs in said compartments; a hub disposed within said centrally located plate apertures and having an aperture substantially coincident with said radially disposed apertures; lugs on said hub engaging the springs in said compartments; and fastening means passing through said hub aperture and said radially disposed apertures, the relative size thereof to said apertures being such as to permit limited relative movement between said hub and said plates.

7. In a shock absorbing and vibration dampening mechanism for a clutch assembly, a disc arranged to drive or be driven and having an opening therein; a plurality of means extending over said opening and defining a series of substantially closed compartments; shock absorbing means comprising coil springs in said compartments; means arranged to be driven or drive in cooperation with said disc positioned in operative relation with said shock absorbing means, the latter means being characterized by a greater reaction in one direction of drive than in another; and means to permit limited relative motion between said disc and the means to drive or be driven thereby.

8. In a shock absorbing and vibration dampening mechanism for a clutch assembly, a disc arranged to drive or be driven and having an opening therein; a plurality of means fixed to said disc and extending over said opening and defining a series of substantially closed compartments, said means having apertures therein; shock absorbing means in said compartments; means arranged to be driven or drive in cooperation with said disc positioned in operative relation with said shock absorbing means, and having an aperture therein in substantial coincidence with said first mentioned apertures, said shock absorbing means being characterized by a greater reaction in one direction of drive than in another; and fastening means of a size relative to said apertures to permit limited relative motion between said disc and the means to drive or be driven thereby.

9. In a shock absorbing and vibration dampening mechanism for a clutch assembly, a disc arranged to drive or be driven and having an opening therein; a plurality of plates covering said opening and defining a series of substantially closed compartments, said plates having corresponding apertures therein; a hub mounted for relative movement within said plates and arranged to drive or be driven in cooperation with said disc, said hub having an aperture therein corresponding to the apertures in said plates; resilient means positioned in said compartments; lugs on said hub disposed to engage said resilient means, the latter in one direction of drive being characterized by a greater reaction than in another direction of drive; and fastening means engaging said apertures and of a relative size thereto to permit limited relative movement between said plates and said hub.

10. In a shock absorbing and vibration dampening mechanism for a clutch assembly, a hub member and a disc member arranged in driving relation; a plurality of separate sets of coil springs arranged between said members to absorb shocks therebetween in all directions of drive, one set of coil springs functioning to cushion the drive in one direction only, and the other set of coil springs functioning to cushion the drive in the other direction only, one of said sets of coil springs including a larger number of springs than the other.

ROBERT P. LEWIS.